United States Patent

Lovelace et al.

[11] Patent Number: 5,221,137
[45] Date of Patent: Jun. 22, 1993

[54] VEHICLE FRONT HEADLAMP ASSEMBLY

[75] Inventors: Ronald R. Lovelace, Grosse Pointe Woods; Leah G. Stovall, Warren, both of Mich.

[73] Assignee: Ford Motor Company, Dearborn, Mich.

[21] Appl. No.: 902,175

[22] Filed: Jun. 22, 1992

[51] Int. Cl.⁵ ............................................. B60Q 1/06
[52] U.S. Cl. .................................... 362/61; 362/66; 362/101
[58] Field of Search .......................... 362/61, 66, 101

[56] References Cited

U.S. PATENT DOCUMENTS

| | | | |
|---|---|---|---|
| 1,964,408 | 6/1934 | Stouffer et al. | 88/2.2 |
| 4,660,128 | 4/1987 | Bergin et al. | 362/61 |
| 4,794,495 | 12/1988 | McMahan et al. | 362/66 |
| 4,802,067 | 1/1989 | Ryder et al. | 362/61 |
| 4,916,583 | 4/1990 | Nagasawa | 362/61 |
| 4,922,387 | 5/1990 | Ryder et al. | 362/61 |
| 4,970,629 | 11/1990 | McMahan | 362/61 |
| 5,055,980 | 10/1991 | Mochizaki | 362/61 |
| 5,083,244 | 1/1992 | Shirai et al. | 362/66 |
| 5,111,369 | 5/1992 | Shirai et al. | 362/61 |
| 5,121,303 | 6/1992 | Shirai et al. | 362/61 |
| 5,151,849 | 9/1992 | Nagengast et al. | 362/61 |

*Primary Examiner*—Ira S. Lazarus
*Assistant Examiner*—L. Heyman
*Attorney, Agent, or Firm*—Roger L. May; Daniel M. Stock

[57] ABSTRACT

A vehicle front headlamp assembly (20) includes a front lens (22) and a rear housing (24) that receives an electrical element (30) and has a plurality of rearwardly extending attachment bosses (34,36,38) one of which functions as a leveling boss (36) that receives a bubble level vial (48) whose front end (50) is mounted by a front end (54) of the leveling boss and whose rear end (52) is mounted by a connection (62). In one construction, the connection (62) provides a fixed securement of the leveling vial and in another construction an adjuster (96) permits vertical adjustment of the rear end of the vial.

20 Claims, 3 Drawing Sheets

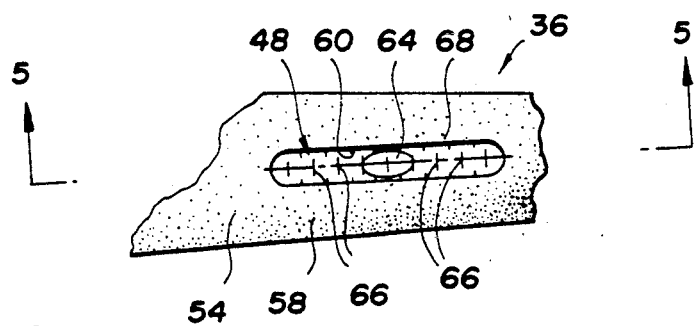
Fig. 4
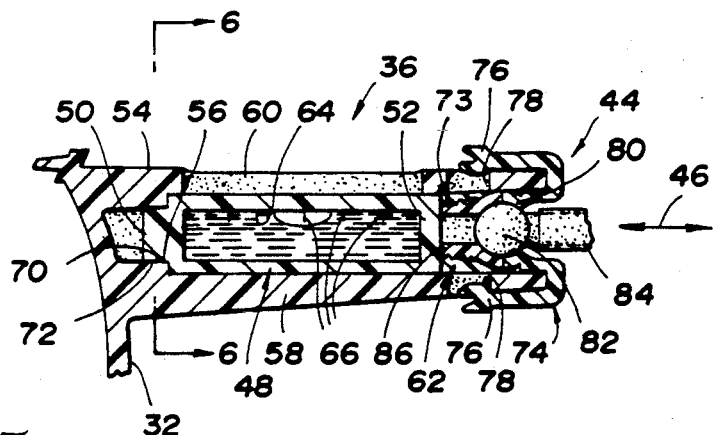
Fig. 5
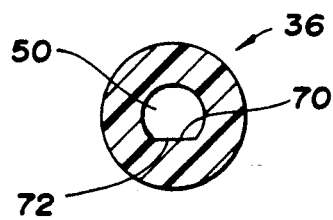
Fig. 6
Fig. 7
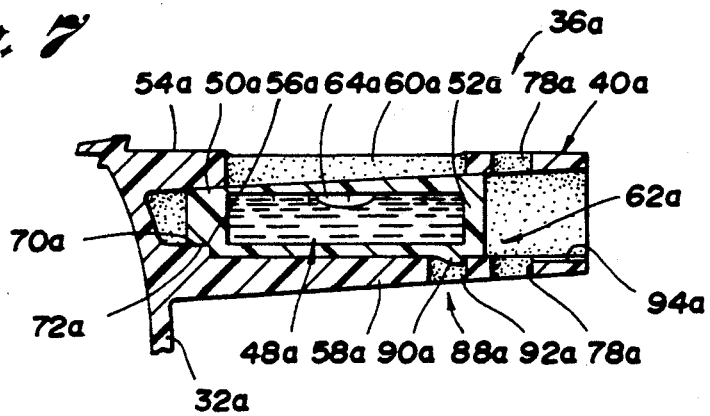

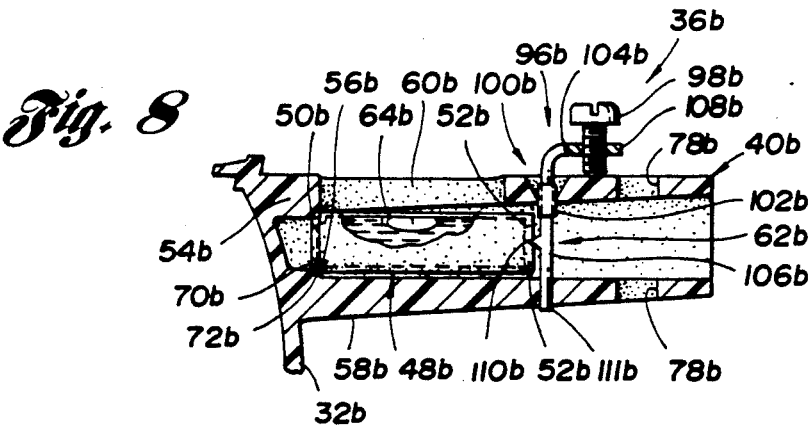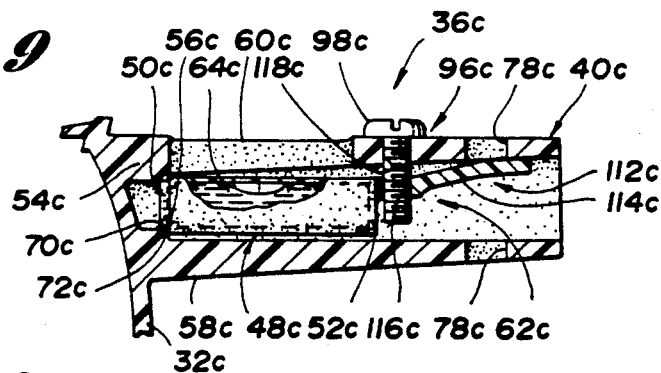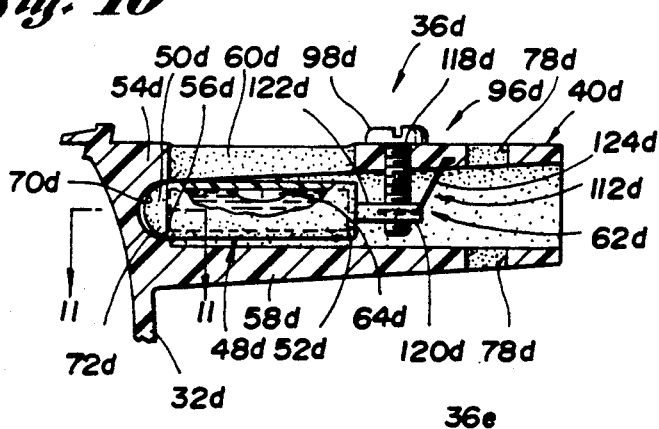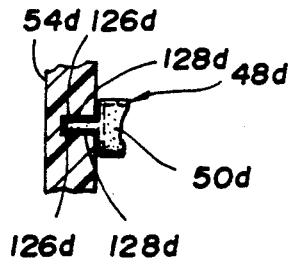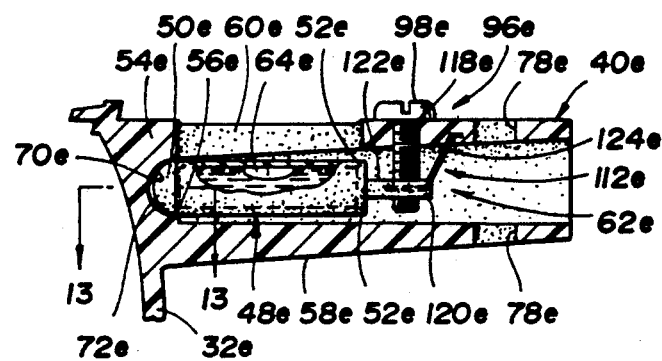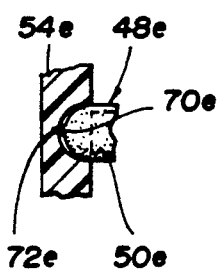

VEHICLE FRONT HEADLAMP ASSEMBLY

TECHNICAL FIELD

This invention relates to a vehicle front headlamp assembly having a bubble level vial for use in aiming the headlamp assembly.

BACKGROUND ART

Vehicle front headlamp assemblies are conventionally mounted on a vehicle through the use of adjusters that provide aiming in the proper vertical and horizontal directions. In order to facilitate aiming in the proper vertical direction, bubble level assemblies have previously been utilized as separate components mounted on the headlamp assembly such as disclosed by U.S. Pat. Nos. 4,794,495 McMaham et al; 4,922,387 Ryder et al; and 4,970,629 McMahan.

Furthermore, such bubble levels, or spirit levels as they are often referred to due to the use of mineral spirits as the liquid in which the bubble is located, have also been mounted directly on a light housing so as to be viewable through a front lens of the associated headlamp assembly as disclosed by U.S. Pat. No. 4,916,583 Nagasawa.

Since tolerance variations affect the positioning of the lamp bulb element and the direction of the resultant beam that is reflected off of a reflector of a housing of the assembly, bubble level vials have also been previously mounted for adjustment as an assembly on headlamp lighting assemblies as disclosed by U.S. Pat. Nos. 4,660,128 Bergin et al and 4,802,067 Ryder et al.

Furthermore, U.S. Pat. No. 1,964,408 Stouffer et al which was noted by the investigation conducted in connection with the present invention discloses an adjustable bubble level that is utilized with a transit and is thus not deemed to be as relevant to the present invention as the prior art references cited above but is nevertheless being cited to make full disclosure of all prior art.

DISCLOSURE OF INVENTION

An object of the present invention is to provide an improved front headlamp assembly that incorporates a bubble level vial for use in aiming the headlamp assembly without requiring extensive modification.

In carrying out the above object and other objects of the invention, a vehicle front headlamp assembly constructed in accordance with the invention includes a front lens and a rear housing located rearwardly of the front lens to mount an element that shines light forwardly through the front lens. The rear housing has a molded plastic construction including a forwardly opening housing portion that receives the element and also including a plurality of attachment bosses molded integrally in a one-piece construction with the housing portion and projecting rearwardly from the housing portion. Each attachment boss has a rear end including an attachment construction for providing mounting and attachment thereof on an associated vehicle. One of the attachment bosses is a leveling boss having a hollow construction and includes a bubble level vial that is received therein and has front and rear ends. The leveling boss also has a front end including a mounting surface within the hollow construction thereof for mounting the front end of the bubble level vial and also includes an intermediate portion having a view opening through which the bubble level vial can be seen. A connection secures the rear end of the bubble level vial to the rear end of the leveling boss so the bubble level vial can be viewed for use in aiming the headlamp assembly.

In the preferred construction of the vehicle front headlamp assembly, the leveling boss has an upper side at which the view opening is located so the bubble level vial can be viewed from above during the aiming.

Different embodiments of the vehicle headlamp assembly are disclosed as having the front ends of the leveling boss and bubble level vial provided with engaged surfaces that prevent rotation of the bubble level vial about a longitudinal axis between the ends of the vial. These engaged surfaces in certain of the embodiments extend generally horizontally and in other embodiments extend generally vertically.

The vehicle front headlamp assembly in two preferred embodiments has the connection of the leveling boss provided with means for securing the rear end of the bubble level vial to the rear end of the leveling boss in a fixed relationship. In one of these embodiments, the fixed securing means includes a fastener that attaches the leveling boss to the associated vehicle and also engages the rear end of the bubble level vial to provide fixed securement thereof to the leveling boss. In the other embodiment, the fixed securing means includes a tab and notch construction that is locked upon insertion of the bubble level vial into the leveling boss.

In other constructions, the connection of the leveling boss includes an adjuster that adjusts the elevation of the rear end of the bubble level vial. The engaged surfaces of the front ends of the leveling boss and the bubble level vial are also disclosed as extending vertically and having a curved shape that facilitates pivoting of the bubble level vial about the front end thereof upon adjustment of the adjuster. More specifically, the vertically extending curved surfaces of the front ends of the boss and the bubble level vial are disclosed in one construction as having laterally spaced edges and in another construction as having forwardly pointed shapes.

Each disclosed embodiment of the adjuster of the leveling boss connection has a threaded adjusting member. In one embodiment, the adjuster includes a ratcheting mechanism that cooperates with the threaded adjustment member to adjust the elevation of the rear end of the bubble level vial. The adjuster is also disclosed as including a spring that cooperates with the threaded adjusting member in adjusting the elevation of the rear end of the bubble level vial. In one embodiment, the bubble level vial is made from plastic integral with the spring. In another embodiment, the spring of the adjuster has a metallic construction which most preferably has one leg secured to the rear end of the bubble level vial and another leg that is resiliently biased against the rear end of the leveling boss.

The objects, features and advantages of the present invention are readily apparent from the following detailed description of the best modes for carrying out the invention when taken in connection with the accompanying drawings.

BRIEF DESCRIPTION OF DRAWINGS

FIG. 4 is an enlarged partial plan view taken along the direction of line 4—4 in FIG. 3;

FIG. 5 is an elevational sectional view taken along the direction of line 5—5 in FIG. 4;

FIG. 6 is a sectional view taken along the direction of line 6—6 in FIG. 5;

FIG. 7 is a sectional view similar to FIG. 5 of another embodiment of the leveling boss;

FIG. 8 is a sectional view through another embodiment of the leveling boss;

FIG. 9 is a sectional view through another embodiment of the leveling boss;

FIG. 10 is a sectional view through another embodiment of the leveling boss;

FIG. 11 is a sectional view taken along the direction of line 11—11 in FIG. 10;

FIG. 12 is a sectional view through another embodiment of the leveling boss; and FIG. 13 is a sectional view taken along the direction of line 13—13 in FIG. 12.

BEST MODES FOR CARRYING OUT THE INVENTION

Figure 1:
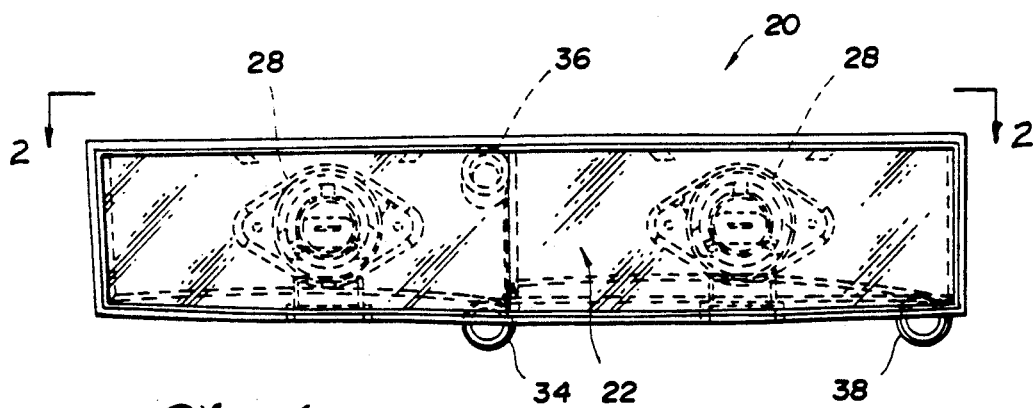
FIG. 1 is a front elevational view of a vehicle front headlamp assembly which is constructed in accordance with the present invention.
Figure 2:
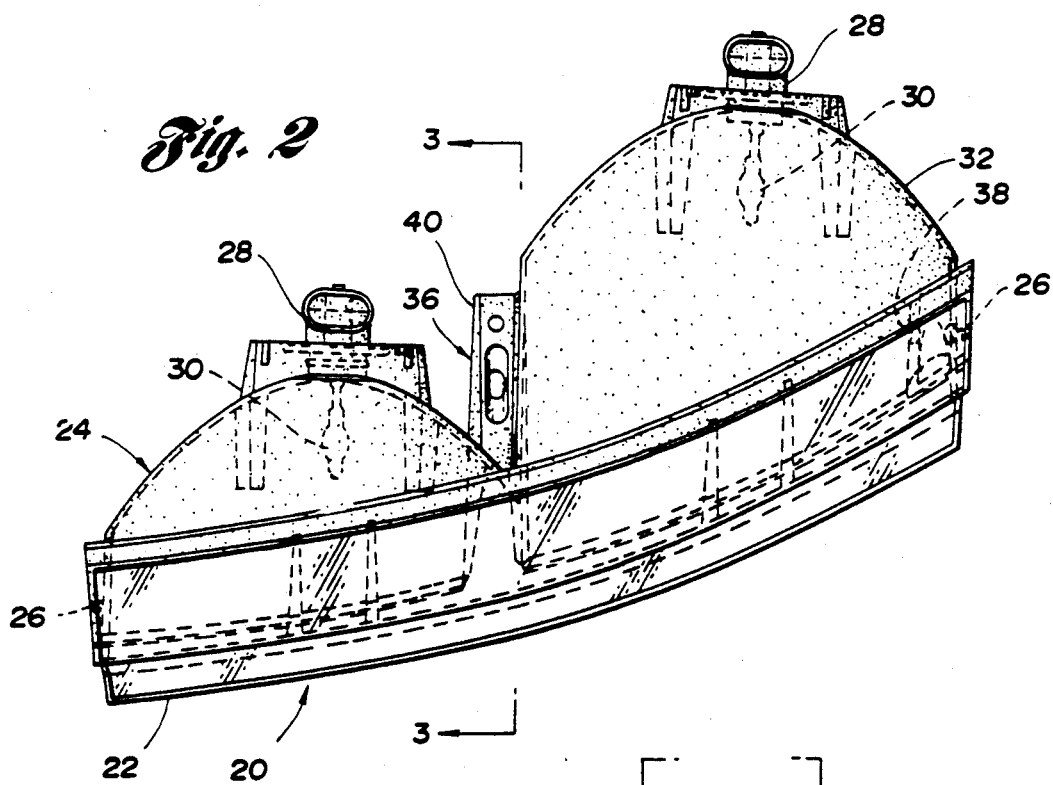
FIG. 2 is a top plan view of the headlamp assembly taken along the direction of line 2—2 in FIG. 1 to illustrate a leveling boss.
Figure 3:
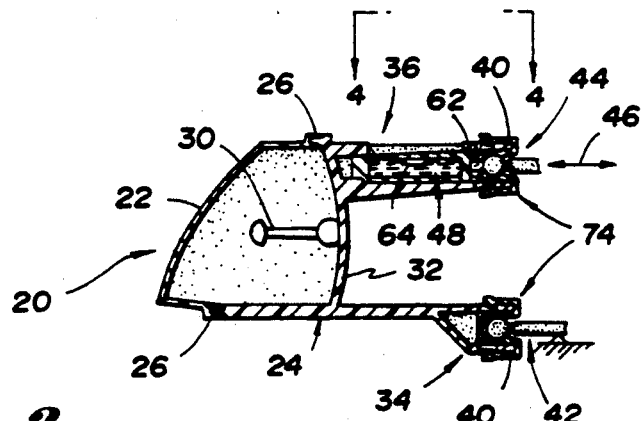
FIG. 3 is an elevational view taken in section along the direction of line 3—3 in FIG. 2.

As illustrated in FIGS. 1 through 3 of the drawings, a vehicle front headlamp assembly generally indicated by 20 is constructed in accordance with the present invention and includes a front lens 22 as well as a rear housing 24 located rearwardly of the front lens and having a sealed joint 26 best illustrated in FIG. 3. The rear housing 24 includes at least one electrical connector 28 and, as illustrated, is of the dual beam type having a pair of such electrical connectors each of which provides electrical connection to an associated element 30 that shines light forwardly through the front lens 22. The rear housing 24 has a molded plastic construction including a forwardly opening housing portion 32 that receives each element 30 and also includes a plurality of attachment bosses 34, 36 and 38 molded integrally in a one-piece construction with the housing portion projecting rearwardly therefrom as best shown in FIG. 3. Each attachment boss has an associated rear end 40 for providing mounting thereof on an associated vehicle. More specifically, the one centrally located lower attachment boss 34 as shown in FIG. 3 is positioned by a fixed ball and clip connector 42 so as to be longitudinally positioned with respect to the vehicle but pivotal about both lateral and vertical axes with respect to the vehicle. The attachment boss 36 located at the central upper position in FIG. 2 is mounted and attached as shown in FIG. 3 by an adjustable ball and clip connector 44 for forward and rearward movement as shown by arrows 46 to provide pivoting about the boss 34 and consequent vertical adjustment of each light beam. This upper central attachment boss 36 also functions as a leveling boss as is hereinafter more fully described. Furthermore, the lower right attachment boss 38 in FIG. 2 also includes an adjustable ball and clip connector for providing pivoting about the boss 34 and consequent horizontal adjustment of each light beam that shines from the assembly.

With additional reference to FIGS. 4 through 6, the one attachment boss 36 that functions as a leveling boss has a hollow construction and includes a bubble level vial 48 that is received therein and has front and rear ends 50 and 52. The leveling boss 36 has a front end 54 including a mounting surface 56 within the hollow construction thereof for mounting the front end 50 of the bubble level vial 48. The leveling boss 36 also includes an intermediate portion 58 having a view opening 60 through which the bubble level vial 48 can be seen. A connection 62 which can have different constructions as is hereinafter more fully described secures the rear end 52 of the bubble level vial 48 to the rear end of the leveling boss 36 so the bubble level vial can be viewed for use in aiming the headlamp assembly. More specifically, longitudinal adjustment of the adjustable ball and clip connector 44 (FIG. 3) forwardly or rearwardly as shown by arrows 46 allows the bubble 64 of the bubble level vial to be centered with respect to the markings 66 as shown in FIG. 4 in order to provide the proper vertical adjustment of the light beam from the associated headlamp assembly. The vertical aiming of the headlamp assembly is thus facilitated without the need for any involved instrumentation.

As best shown in FIG. 4, the leveling boss 36 has an upper side 68 at which the view opening 60 is preferably located so the bubble level vial 48 can be viewed from above. This construction with the leveling boss 36 located at the upper position as shown in FIGS. 1 and 3 facilitates viewing of the leveling boss during aiming.

As shown in FIGS. 5 and 6, the front end 54 of the leveling boss 36 has a surface 70 that is engaged by a surface 72 of the front end 50 of the bubble level vial 48 and these engaged surfaces prevent rotation of the bubble level vial about a longitudinal axis between the front and rear ends of the vial so the bubble 64 is always properly positioned for viewing and use in aiming as previously described. More specifically, these engaged surfaces 70 and 72 as best shown in FIG. 6 extend generally horizontally.

As best shown in FIG. 5, a fastener 73 of the adjustable ball and clip connector 44 functions as the connection 62 and provides a means for securing the rear end 52 of the bubble level vial 48 to the rear end 40 of the leveling boss in a fixed relationship. This fastener 73 is embodied by a clip 74 having locking tangs 76 that are received by holes 78 in the rear end 40 of the leveling boss 36. Clip 74 also has a central socket 80 that receives a ball 82 of a threaded adjusting member 84 whose threading provides movement in the opposite directions shown by arrows 46 in order to provide the leveling adjustment as previously described. Clip 74 has an end 86 that engages the rear end 52 of the bubble level vial 48 to provide the fixed securement thereof within the hollow construction of the leveling boss 36.

Further embodiments of the vehicle front headlamp assembly of this invention are hereinafter described in connection with FIGS. 7 through 13 which illustrate the leveling boss thereof and have constructions which are the same as the previously described embodiment except as will be noted and thus have the same reference numerals applied thereto with subscript identifiers differentiating the embodiments. Thus, much of the previous description is applicable to these additional embodiments and thus will not be repeated.

With reference to FIG. 7, the leveling boss 36a of this embodiment has a connection 62d with a construction 88a including a tab 90a and a notch 92a that provide a means for fixedly securing the rear end 52a of the bubble level vial 48a to the rear end 40a of the leveling boss. More specifically, the rear end 40a of the leveling boss 36a has a groove 94a through which the tab 90a slides upon insertion of the bubble level vial 48a prior to reaching the adjacent hole 78a which receives the locking tang of an associated connector clip in the same manner previously described. Subsequent continued insertion of the bubble level vial 48a causes the tab 90a to move into the notch 92a with a snap action that provides locking thereof in position with the front end 50a of the bubble level vial mounted on the front end 54a of the leveling boss in the same manner previously described.

Each of the embodiments of the leveling boss illustrated in FIGS. 8 through 13 has its connection constructed to include an adjuster 96b, 96c, 96d and 96e that adjusts the elevation of the rear end of the associated bubble level vial as is hereinafter more fully described. Furthermore, the embodiments of the leveling boss 36b and 36c shown in FIGS. 8 and 9 have their front ends and the front ends of the associated bubble level vials with engaged horizontally extending surfaces 70b, 72b and 70c, 72c respectively. The embodiments of the leveling boss 36d and 36e illustrated in FIGS. 10,11 and 12,13 have their engaged front end surfaces 70d and 70e and front end bubble level vial surfaces 72d and 72e extending vertically as is hereinafter more fully described. The adjustment of the bubble level vials 48b, 48c, 48d and 48e is provided by adjustment of the associated adjusters 96b, 96c, 96d and 96e by adjusting the elevation of the rear end of each bubble level vial. More specifically, each of the adjusters includes a threaded adjusting member 98b, 98c, 98d and 98e whose threading adjustment adjusts the bubble level vial. This adjustment is normally performed before mounting of the associated headlamp assembly on the vehicle to account for any tolerance variation in manufacturing and assembly so that the level indication after mounting on the vehicle will correspond to the direction of the resultant beam in a vertical direction.

With reference to FIG. 8, the leveling boss 36b illustrated has its adjuster 96b provided with a ratcheting mechanism 100b to control the vertical elevation of the rear end 52b of the associated bubble level vial 48b. More specifically, this ratcheting mechanism 100b includes a ratchet member 102b having an internal serrated hole. The ratcheting mechanism also includes an L-shaped positioning member 104b which has a long vertical leg 106b and a short horizontal leg 108b. The long leg 106b has a projection 110b that is received within a suitable indentation in the rear end 52b of the bubble level vial to control its positioning about the front engaged surfaces 70b and 72b, and the lower end 111b of the long leg 106b is received in a slidable relationship within a hole in the lower side of the leveling boss. Within the ratchet member 102b, the long leg 106b also has teeth positioned along its length so that upward and downward movement provides adjustment that is then maintained by the serration and tooth engagement. The short leg 108b of positioning member 104b has a threaded opening which receives the threaded adjusting member 98b whose threaded adjustment member moves the positioning member 104b upwardly. Upon assembly, the adjuster 96b is positioned with the rear end 52b of the bubble level vial 48b located in its lowermost position. The threaded adjusting member 98b is then adjusted to pull the positioning member 94b upwardly until the bubble 64b indicates a level position. If the rear end 52b of the bubble level vial is moved upwardly too far, the threaded adjusting member 98b can be rotated in a reverse direction and then pushed downwardly as the long leg 106b is pushed through the ratchet member 102b in preparation for another try at leveling the bubble level vial so that it will be at the proper position for providing an indication of mounting.

Each of the embodiments shown in FIGS. 9 through 12 includes a spring 112c, 112d and 112e that cooperates with the associated threading adjustment member 98c, 98d and 98e in adjusting the elevation of the rear end of the association bubble level vial.

As illustrated in FIG. 9, this embodiment of the leveling boss 36c has its bubble level vial 48c made from plastic integral with the spring 112c. More specifically, the spring 112c has a leg 114c that extends rearwardly from the rear end 52c of the bubble level vial and has a threaded opening 116c that receives the threaded adjusting member 98c as does an unthreaded opening 118c of the leveling boss. The distal end of the spring leg 114c engages the interior of the rear end 40 of the leveling boss to bias the rear end 52c of the bubble level vial downwardly. Threaded rotation in one direction of the threaded adjusting member 98c thus moves the rear end 52c of the bubble level vial 48c upwardly about the front engaged surfaces 70c and 72c until the bubble 64c is in the proper position with respect to the vertical direction of the beam of the headlamp assembly. With this embodiment, the threaded adjusting member 98c can be rotated in opposite directions to move the rear end 52c of the bubble level vial 48c both upwardly and downwardly as required to perform the leveling.

The embodiments of the leveling boss 36d and 36e respectively shown in FIGS. 10,11 and 12,13 each have an associated spring 112d and 112e of a metallic construction which are, in fact, identical to each other. More specifically, each of these embodiments has the rear end 52d,e of its bubble level vial 48d,e provided with a rearwardly extending tab 120d,e to which one leg 122d,e of the associated spring 112d,e is secured in any suitable manner. Another leg 124d,e extends from the other spring leg and is biased against the upper interior of the rear end 40d,e of the associated leveling boss. Each threaded adjusting member 98d,e extends through an unthreaded hole 118d,e at the upper side of the associated leveling boss and is received by a threaded opening in either the vial tab 120d,e or spring leg 122d,e. Rotation of the threaded adjusting member 98d,e thus moves the rear end 52d,e upwardly and downwardly as the associated bubble level vial 48d,e pivots about its front end 52d,e.

Each of the embodiments of the leveling boss 36d and 36e respectively illustrated by FIGS. 10,11 and 12,13 has its engaged front surfaces 70d,e and 72d,e provided with a vertically extending construction of a curved shape that facilitates the pivoting of the associated bubble level vial 48d,e about the front end thereof upon adjustment of the associated adjuster 96d,e as described above. In the embodiment of FIGS. 10 and 11, the vertically extending front curved boss surface 70d has laterally spaced edges 126d and the vertically extending front curved vial surface 72d has laterally spaced edges 128d. In the embodiment of FIGS. 12 and 13, the vertically extending front curved boss and vial surfaces 70e and 72e have pointed shapes that are engaged in a mating relationship. More specifically, the boss surface 70e has a negative pointed shape that receives the positive pointed shape of the vial surface 72e.

While the best modes for carrying out the invention have been described above, those familiar with the art to which this invention relates will recognize various alternatives and designs and embodiments for carrying out the invention as defined by the following claims.

We claim:

1. A vehicle front headlamp assembly, comprising: a front lens; a rear housing located rearwardly of the front lens to mount an element that shines light forwardly through the front lens; said rear housing having a molded plastic construction including a forwardly opening housing portion that receives the element and also including a plurality of attachment bosses molded integrally in a one-piece construction with the housing portion and projecting rearwardly therefrom; each attachment boss having a rear end including an attachment construction for providing mounting and attachment thereof on an associated vehicle; one of said attachment bosses being a leveling boss having a hollow construction and including a bubble level vial that is received therein, said bubble vial having both a front end and a rear end; said leveling boss having a front end including a mounting surface within the hollow construction thereof for mounting the front end of the bubble level vial and also including an intermediate portion having a view opening through which the bubble level vial can be seen; and a connection that secures the rear end of the bubble level vial to the rear end of the leveling boss so the bubble level vial can be viewed for use in aiming the headlamp assembly.

2. A vehicle front headlamp assembly as in claim 1 wherein the leveling boss has an upper side at which the view opening is located so the bubble level vial can be viewed from above.

3. A vehicle front headlamp assembly as in claim 1 wherein the front ends of the leveling boss and bubble level vial have engaged surfaces that prevent rotation of the bubble level vial about longitudinal axis between the ends of the vial.

4. A vehicle front headlamp assembly as in claim 3 wherein the engaged surfaces extend generally horizontally.

5. A vehicle front headlamp assembly as in claim 3 wherein the engaged surfaces extend generally vertically.

6. A vehicle front headlamp assembly as in claim 1 wherein the connection of the leveling boss includes fixed securing means for securing the rear end of the bubble level vial to the rear end of the leveling boss in a fixed relationship.

7. A vehicle front headlamp assembly as in claim 6 wherein the fixed securing means includes a fastener that attaches the leveling boss to the associated vehicle and also engages the rear end of the bubble level vial to provide fixed securement thereof to the leveling boss.

8. A vehicle front headlamp assembly as in claim 7 wherein the fixed securing means includes a tab and notch construction that is locked upon insertion of the bubble level vial into the leveling boss.

9. A vehicle front headlamp assembly as in claim 1 wherein the connection of the leveling boss includes an adjuster that adjusts the elevation of the rear end of the bubble level vial.

10. A vehicle front headlamp assembly as in claim 9 wherein the front ends of the leveling boss and bubble level vial have engaged surfaces that prevent rotation of the bubble level vial.

11. A vehicle front headlamp assembly as in claim 9 wherein the engaged surfaces of the front ends of the leveling boss and bubble level vial extend vertically and have a curved shape that facilitates pivoting of the bubble level vial about the front end thereof upon the adjustment of the adjuster.

12. A vehicle front headlamp assembly as in claim 11 wherein the engaged surfaces of the front ends of the leveling boss and bubble level vial have laterally spaced edges.

13. A vehicle front headlamp assembly as in claim 11 wherein the engaged surfaces of the front ends of the leveling boss and bubble level vial have forwardly pointed shapes.

14. A vehicle front headlamp assembly as in claim 9 wherein the adjuster of the leveling boss connection includes a threaded adjusting member.

15. A vehicle front headlamp assembly as in claim 14 wherein the adjuster includes a ratcheting mechanism that cooperates with the threaded adjusting member to adjust the elevation of the rear end of the bubble level vial.

16. A vehicle front headlamp assembly as in claim 14 wherein the adjuster also includes a spring that cooperates with the threaded adjusting member in adjusting the elevation of the rear end of the bubble level vial.

17. A vehicle front headlamp assembly as in claim 16 wherein the bubble level vial is made from plastic integral with the spring.

18. A vehicle front headlamp assembly as in claim 16 wherein the spring of the adjuster has a metallic construction including one leg secured to the rear end of the bubble level vial and another leg that is resiliently biased against the rear end of the leveling boss.

19. A vehicle front headlamp assembly, comprising: a front lens; a rear housing located rearwardly of the front lens to mount an element that shines light forwardly through the front lens; said rear housing having a molded plastic construction including a forwardly opening housing portion that receives the element and also including a plurality of attachment bosses molded integrally in a one-piece construction with the housing portion and projecting rearwardly therefrom; each attachment boss having a rear end including an attachment construction for providing mounting and attachment thereof on an associated vehicle; one of said attachment bosses being a leveling boss having a hollow construction and including a bubble level vial that is received therein said bubble vial having both a front end and a rear end; said leveling boss having a front end including a mounting surface within the hollow construction thereof for mounting the front end of the bubble level vial and also including an intermediate portion having an upper side including a view opening through which the bubble level vial can be seen from above; and a connection that secures the rear end of the bubble level vial to the rear end of the leveling boss in a fixed relationship so the bubble level vial can be viewed for use in aiming the headlamp assembly.

20. A vehicle front headlamp assembly, comprising: a front lens; a rear housing located rearwardly of the front lens to mount an element that shines light forwardly through the front lens; said rear housing having a molded plastic construction including a forwardly opening housing portion that receives the element and also including a plurality of attachment bosses molded integrally in a one-piece construction with the housing portion and projecting rearwardly therefrom; each attachment boss having a rear end including an attachment construction for providing mounting and attachment thereof on an associated vehicle; one of said attachment bosses being a leveling boss having a hollow construction and including a bubble level vial that is received therein said bubble vial having both a front end and a rear end; said leveling boss having a front end including a mounting surface within the hollow construction thereof for mounting the front end of the bubble level vial and also including an intermediate portion having an upper side including a view opening through which the bubble level vial can be seen from above; and a connection that secures the rear end of the bubble level vial to the rear end of the leveling boss and includes an adjuster having a threaded adjusting member that is adjustable to adjust the elevation of the rear end of the bubble level vial so the bubble level vial can be properly located and viewed through the opening for use in aiming the headlamp assembly.

* * * * *

UNITED STATES PATENT AND TRADEMARK OFFICE
CERTIFICATE OF CORRECTION

PATENT NO. : 5,221,137
DATED : June 22, 1993
INVENTOR(S) : Ronald R. Lovelace et al It is certified that error appears in the above-indentified patent and that said Letters Patent is hereby corrected as shown below:

Column 6, line 49, change "52" to --50--.
Column 7, line 19, Claim 1, after "bubble" insert --level--.
Column 8, line 46, Claim 19, after "therein" insert --,--.
Column 8, line 46, Claim 19, after "bubble" insert --level--.
Column 9, line 3, Claim 20, after "therein" insert --,--.
Column 9, line 3, Claim 20, after "bubble" insert --level--.

Signed and Sealed this

Twelfth Day of April, 1994

Attest:

BRUCE LEHMAN

Attesting Officer

Commissioner of Patents and Trademarks